Dec. 3, 1946.   E. S. KUBAT   2,412,091
ROOST FOR FOWLS
Filed Dec. 2, 1942
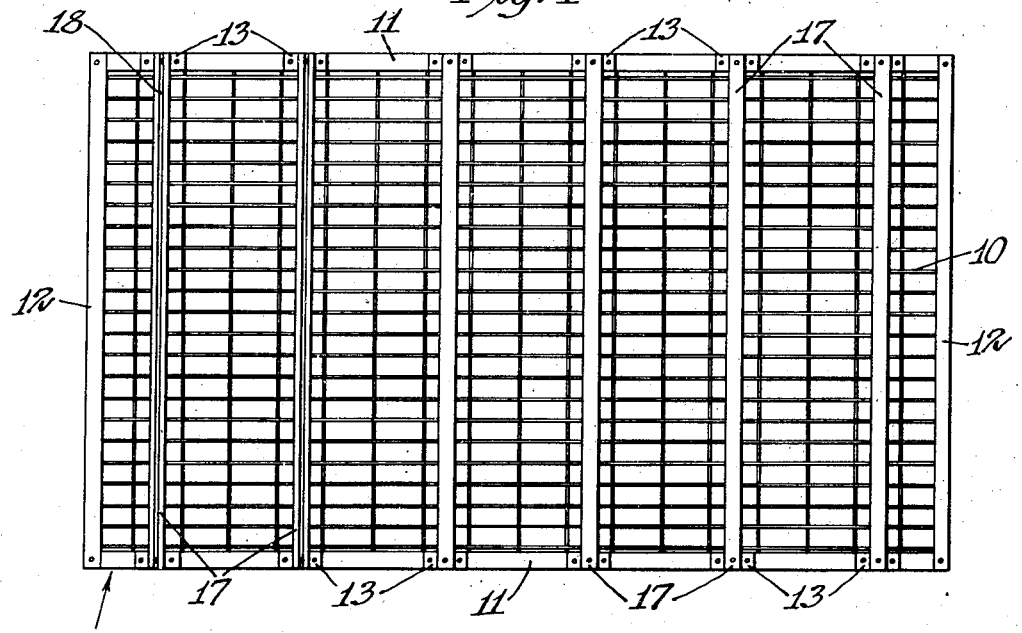
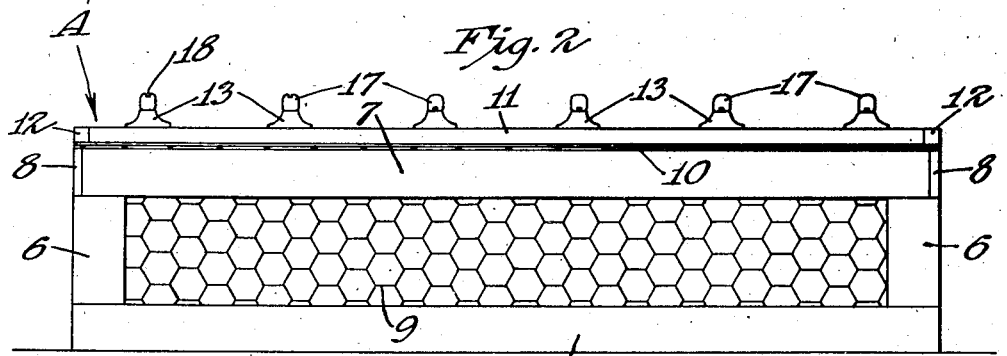
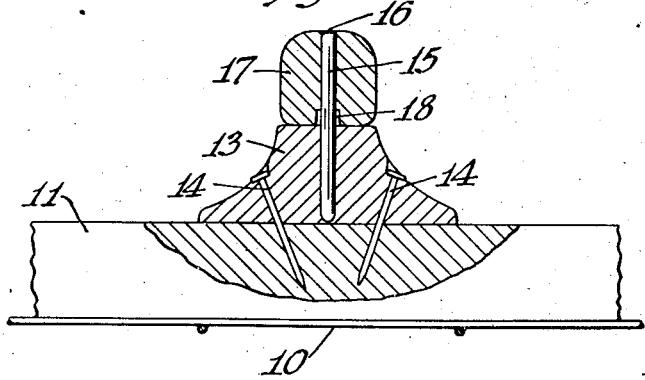
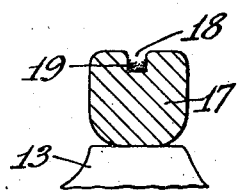
Inventor
Emil S. Kubat
By Williamson + Williamson
Attys.

Patented Dec. 3, 1946

2,412,091

UNITED STATES PATENT OFFICE 2,412,091

ROOST FOR FOWLS

Emil S. Kubat, Owatonna, Minn.

Application December 2, 1942, Serial No. 467,603

1 Claim. (Cl. 119—25)

This invention relates to a roost for birds and more particularly it is intended to be used for poultry.

Poultry raisers are constantly bothered with the problem of exterminating lice and other vermin on poultry in order to maintain healthy chickens. Roosts have been devised with pockets or channels therein on the upper side thereof to hold a vermin destroying substance. However, experience has proven that with a roost of that type it rapidly fills up with dirt and droppings and thereby becomes a means of spreading disease through the flock. Thus the beneficial effect of the vermin destroying chemical is offset. Furthermore, it is only necessary to treat the birds periodically, each treatment consisting of an application of some volatile chemical such as nicotine sulphate and repeating the application in about a week or ten days after the eggs of lice previously killed have been hatched.

It is an object of my invention to provide a roost for birds such as chickens and other kinds of fowl wherein means is provided for holding a chemical compound such as nicotine sulphate and so arranging the roost that the chemical holding means is in an upright position where it can catch droppings only during the short periods of actual extermination of vermin. At other times the roost is arranged so that the chemical holding means is protected and cannot accumulate dirt and droppings.

More specifically it is an object of my invention to provide a longitudinally channeled roost and means for supporting the roost so that the channeled portion is facing downwardly at the underside of the roost and wherein the roost can be shifted so that the channeled portion is directed upwardly for the reception of a vermin destroying chemical.

These and other objects and advantages of the invention will more fully appear from the following description wherein like reference characters refer to the same parts throughout the views, and, in which:

Fig. 1 is a plan view of a roost arrangement;

Fig. 2 is a side view thereof;

Fig. 3 is a cross section of a single roost bar and one of its supports; and

Fig. 4 is a cross section of a single roost bar with its position reversed from that shown in Fig. 3.

In Figs. 1 and 2 there is shown a roost frame A having longitudinal bottom members 5, corner uprights 6, longitudinal upper frame members 7 and upper cross members 8. If desired, wire netting 9 can be used at the sides and end of the frame A and wire netting 10 can be placed across the top so that the droppings will fall through to the floor or ground and the chickens or other fowl cannot walk through them.

Overlying the top wire netting 10 is a pair of longitudinal sills 11 connected by end members 12. At spaced points on the sills 11 are roost bases 13 which may be secured to the sills by nails 14. Each of the roost bases 13 has a pin or peg 15 extending vertically therefrom. The pegs 15 are adapted to be received in holes 16 bored in the ends of the roost bars 17. The holes 16 in the roost bars are so formed that the bars can be slipped on and off of the pegs 15 with relative ease and the roost bars 17 can be inverted, the pegs being insertable from the top or the bottom of said roost bars.

The roost bars 17 are provided with longitudinal channels 18 and when they are in their inverted position, as shown in Fig. 4, said channels 18 are adapted to receive and hold a supply of chemical substance indicated at 19 in Fig. 4. This chemical substance is preferably nicotine sulphate, a volatile substance which is warmed by the heat of the fowl as they perch on the roost and the gases rise through the feathers of the fowl and kill lice and other vermin which commonly live on poultry. The channel is made narrow, so that the chemical substance will not come in contact with the feet of the fowl.

As stated above after one application of a vermin destroying chemical the roost bars can be reversed to the position shown in Fig. 3 and then after a period of a week or ten days they can be turned again to present the channels 18 uppermost and the chemical can again be applied. After the second application the channels can again be turned downwardly and left that way for some length of time until it is found that the fowl are again infested and require further treatment.

For purposes of illustration the two left-hand roost bars 17 in Figs. 1 and 2 are shown with the channels uppermost and the remainder of the roost bars are shown with the channels turned down.

While I have shown the roost bars mounted on the pegs 15, it is, of course, not necessary that they be mounted in exactly that manner, the principal idea being to provide a roost wherein the channeled bars can be reversed to face the channels downwardly when treatment of the fowl is unnecessary, and it is also to be understood that various changes may be made in the form, details, arrangement and proportions of the various parts without departing from the scope of my invention.

What is claimed is:

In a bird roost, a bar having opposite sides thereof adapted to serve as bird supporting roosts, the width of said bar being such as to permit the bird to comfortably grasp the same, supporting means for said bar including a base structure having pins extending upwardly therefrom, said bar having apertures therein to loosely receive said pins and being reversible on said pins to present either roosting surface or side of said bar uppermost, and one of said sides of said bar having a longitudinal channel therein for holding a quantity of a vermin destroying substance when said bar is positioned to present said channel uppermost, and said channel being narrow relative to the width of said bar, whereby said vermin destroying substance can be maintained close to but out of contact with the feet of the bird.

EMIL S. KUBAT.